US010663334B2

(12) United States Patent
Briese et al.

(10) Patent No.: US 10,663,334 B2
(45) Date of Patent: May 26, 2020

(54) SENSOR ARRANGEMENT FOR DETERMINING AT LEAST ONE PARAMETER OF A FLUID MEDIUM FLOWING THROUGH A CHANNEL STRUCTURE

(71) Applicant: Robert Bosch GmbH, Stuttgart (DE)

(72) Inventors: Achim Briese, Palo Alto, CA (US); Torsten Mais, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 394 days.

(21) Appl. No.: 15/739,376

(22) PCT Filed: Jul. 22, 2015

(86) PCT No.: PCT/EP2015/066738
§ 371 (c)(1),
(2) Date: Dec. 22, 2017

(87) PCT Pub. No.: WO2016/041664
PCT Pub. Date: Mar. 24, 2016

(65) Prior Publication Data
US 2018/0188087 A1    Jul. 5, 2018

(30) Foreign Application Priority Data

Sep. 16, 2014   (DE) .................. 10 2014 218 591

(51) Int. Cl.
*G01F 1/684*  (2006.01)
*F02D 41/18*  (2006.01)
(Continued)

(52) U.S. Cl.
CPC ......... *G01F 1/6842* (2013.01); *F02D 41/187* (2013.01); *G01F 1/688* (2013.01);
(Continued)

(58) Field of Classification Search
CPC ...... G01F 1/6842; G01F 1/688; G01F 1/6845; G01F 5/00; G01F 1/684; G01F 15/00; F02D 41/187; F02D 41/18
See application file for complete search history.

(56) References Cited

U.S. PATENT DOCUMENTS 6,526,822 B1 *  3/2003  Maeda .................. G01F 1/6842
                                                     73/204.21
7,089,788 B2 *  8/2006  Yonezawa ............. G01F 1/6842
                                                     73/114.32
(Continued)

FOREIGN PATENT DOCUMENTS

CN           1313948 A      9/2001
CN         101454647 A      6/2009
(Continued)

OTHER PUBLICATIONS

International Search Report dated Sep. 28, 2015, of the corresponding International Application PCT/EP2015/066738 filed Jul. 22, 2015.
(Continued)

*Primary Examiner* — Freddie Kirkland, III
(74) *Attorney, Agent, or Firm* — Norton Rose Fulbright US LLP; Gerard Messina

(57) ABSTRACT

A sensor system is provided for determining at least one parameter of a fluid medium flowing through a channel structure, e.g., an air mass flow of an internal combustion engine. The sensor system has a sensor housing, e.g., a plug-in sensor that is introduced or can be introduced into a flow tube, in which the channel structure is formed, and at least one sensor chip, situated in the channel structure, for determining the parameter of the fluid medium. The sensor housing has an inlet into the channel structure, oriented opposite a main direction of flow of the fluid medium, and an outlet from the channel structure. The channel structure
(Continued)

includes a main channel and a measurement channel. The measurement channel branches off from the main channel. The sensor chip is in the measurement channel. The main channel and the measurement channel discharge together into the outlet from the channel structure.

20 Claims, 5 Drawing Sheets

(51) Int. Cl.
  *G01F 5/00* (2006.01)
  *G01F 1/688* (2006.01)
  *G01F 15/00* (2006.01)
(52) U.S. Cl.
  CPC .............. *G01F 1/6845* (2013.01); *G01F 5/00* (2013.01); *F02D 41/18* (2013.01); *G01F 1/684* (2013.01); *G01F 15/00* (2013.01)

(56) References Cited

U.S. PATENT DOCUMENTS

| | | | | |
|---|---|---|---|---|
| 7,654,134 B2* | 2/2010 | Enomoto | .............. | G01F 1/6842 73/114.32 |
| 8,205,493 B2* | 6/2012 | Mais | .................... | G01F 1/6842 73/202.5 |
| 8,978,455 B2* | 3/2015 | Mais | ....................... | F02D 41/18 73/114.32 |
| 9,217,655 B2* | 12/2015 | Briese | ..................... | G01F 1/684 |
| 9,618,373 B2* | 4/2017 | Mais | ..................... | G01F 1/6842 |
| 9,752,910 B2* | 9/2017 | Wagner | .................... | G01F 1/692 |
| 10,184,817 B2* | 1/2019 | Mais | ..................... | G01F 1/6842 |
| 2003/0159501 A1* | 8/2003 | Renninger | ............ | G01F 1/6842 73/114.33 |
| 2005/0097947 A1 | 5/2005 | Yonezawa | | |
| 2010/0095753 A1* | 4/2010 | Enomoto | .............. | G01F 1/6842 73/114.32 |
| 2017/0261359 A1* | 9/2017 | Briese | ..................... | G01F 1/684 |
| 2017/0328753 A1* | 11/2017 | Briese | ................... | G01F 1/6842 |

FOREIGN PATENT DOCUMENTS

| | | |
|---|---|---|
| DE | 10135142 A1 | 10/2002 |
| DE | 102008001982 A1 | 12/2008 |
| DE | 102008049843 A1 | 7/2010 |
| DE | 102010028388 A1 | 11/2010 |
| DE | 102010043572 A1 | 6/2011 |
| EP | 1091195 A1 | 4/2001 |
| JP | 2003149016 A | 5/2003 |
| JP | 2004012274 A | 1/2004 |
| JP | 2004519690 A | 7/2004 |
| WO | 2008128886 A1 | 10/2008 |

OTHER PUBLICATIONS

Konrad Reif (pub.): Sensoren im Kraftfahrzeug [Sensors in the motor vehicle), 1st ed., 2010, pp. 146-148.

* cited by examiner

SENSOR ARRANGEMENT FOR DETERMINING AT LEAST ONE PARAMETER OF A FLUID MEDIUM FLOWING THROUGH A CHANNEL STRUCTURE

BACKGROUND INFORMATION

Numerous conventional methods and devices are available for determining a flow property of fluid media, i.e., liquids or gases. The flow properties can be any physical and/or chemically measurable properties that qualify or quantify a flow of the fluid medium. In particular, the property can be a flow speed and/or a mass flow and/or a volume flow.

Below, the present invention is described in particular with reference to so-called hot-film air mass sensors, as described for example in Konrad Reif (pub.): Sensoren im Kraftfahrzeug (Sensors in the motor vehicle), 1st ed., 2010, pp. 146-148. Such hot-film air mass sensors are based, as a rule, on a sensor chip, in particular a silicon sensor chip, having a sensor membrane as measurement surface or sensor region over which the fluid medium can flow. Generally, the sensor chip includes at least one heating element as well as at least two temperature sensors that are for example situated on the measurement surface of the sensor chip. From an asymmetry of the temperature profile acquired by the temperature sensors, which profile is influenced by the flow of the fluid medium, a mass flow and/or volume flow of the fluid medium can be inferred. Hot-film air mass sensors are standardly fashioned as plug-in sensors that can be placed fixedly or exchangeably in a flow tube. For example, this flow tube can be an intake channel of an internal combustion engine.

A partial flow of the medium flows through at least one main channel provided in the hot-film air mass sensor. A bypass channel is fashioned between the inlet and the outlet of the main channel. In particular, the bypass channel is fashioned so that it has a curved segment for diverting the partial flow of the medium entering through the inlet of the main channel, the curved segment then going over into a segment in which the sensor chip is situated. The last-named segment is the actual measurement channel in which the sensor chip is situated. Here, in the bypass channel a means is provided that conducts the flow and counteracts a separation of the flow of the partial medium flow from the walls of the measurement channel. In addition, the inlet region of the main channel is provided, in the area of its opening oriented opposite the main flow direction, with oblique or curved surfaces that are formed such that medium flowing into the inlet region is diverted away from the part of the main channel that leads to the sensor chip. This has the effect that liquid or solid particles contained in the medium, due to their mass inertia, do not reach the sensor chip, and thus cannot contaminate it.

In practice, such hot-film air mass sensors must satisfy a large number of requirements and boundary conditions. Besides the goal of reducing a pressure drop at the hot-film air mass sensor overall through suitable flow-related designs, one of the main challenges is to further improve the signal quality and the robustness of such devices against contamination by oil and water droplets, as well as rust, dust, and other solid particles. This signal quality relates for example to a mass flow of the medium through the measurement channel leading to the sensor chip, as well as, if necessary, to the reduction of signal drift and the improvement of the signal-to-noise ratio. Here, signal drift refers to the deviation for example of the mass flow of the medium, in the sense of a change in the characteristic curve relation between the actually occurring mass flow and the signal that is to be outputted, ascertained in the context of calibration during manufacturing. In the ascertaining of the signal-noise ratio, the sensor signals outputted in a rapid temporal sequence are considered, whereas the characteristic curve or signal drift relates to a change in the mean value.

In standard hot-film air mass sensors of the type described, as a rule a sensor bearer, having a sensor chip attached or embedded thereon, extends into the measurement channel. For example, the sensor chip can be glued into or onto the sensor bearer. The sensor bearer can for example form a unit having a base plate made of metal, on which an electronics system, a control and evaluation circuit in the form of a circuit board, can also be glued. For example, the sensor bearer can be fashioned as an injection-molded plastic part of an electronics module. The sensor chip and the control and evaluation circuit can for example be connected to one another by bond connections. The resulting electronics module can for example be glued into a sensor housing, and the overall plug-in sensor can be sealed with covers.

Despite the improvements realized by this sensor system, there continues to be potential for improvement with regard to the precision of signal acquisition.

So that the hot-film air mass sensor can supply an air mass signal having as little interference as possible, it is important for there to be a flow that is as uniform as possible to the plug-in sensor, and through the measurement channel therein, and in particular over the measurement surface of the sensor chip. Between an end face of the sensor bearer and the wall of the measurement channel there is a gap whose width is subject to production-related fluctuations. In the region of the sensor bearer, the fluid medium flowing in the measurement channel is divided into three partial mass flows. A first partial mass flow flows over the sensor bearer and the sensor chip, a second partial mass flow flows under the sensor bearer, and a third partial mass flow flows through the gap. After the flow around the sensor bearer, an unstable wake forms having fluctuating flow speeds and pressures. This has the result that upstream as well, in particular in the region of the sensor chip, fluctuating flow quantities arise that cause fluctuations in the measurement signal, in particular having oscillation modes typical for the dimension of the sensor bearer and the flow speed.

SUMMARY

An example sensor system is provided for determining at least one parameter of a fluid medium flowing through a channel structure that can at least to a great extent avoid the disadvantages of known methods and strategies, and in which in particular a reduction of mass flow fluctuations in the channel structure can be achieved, a signal noise and an inflow sensitivity can be reduced, and the capacity for calibration is improved.

The sensor system for determining at least one parameter of a fluid medium flowing through a channel structure, in particular an intake air mass flow of an internal combustion engine, has a sensor housing, in particular a plug-in sensor that is or can be introduced into a flow tube, in which the channel structure is fashioned, and has at least one sensor chip situated in the channel structure for determining the parameter of the fluid medium. The sensor housing has an inlet into the channel structure, oriented opposite a main direction of flow of the fluid medium, and an outlet from the channel structure. The channel structure includes a main channel and a measurement channel. The measurement channel branches off from the main channel. The sensor chip is situated in the measurement channel. The main channel and the measurement channel discharge together into the outlet from the channel structure.

The outlet can be situated in an end face of the sensor housing. A distance of a midpoint of the outlet from the inlet in the main direction of flow can be from 11.0 to 15.0 mm, preferably from 12.0 mm to 14.0 mm, for example 13.0 mm. A midline of the outlet can be inclined at an angle of from 20° to 60° downstream relative to the main direction of flow. The outlet can have a width of from 3.0 mm to 8.0 mm, for example 5.0 mm. The main channel can have at least one first main channel segment in which the measurement channel branches off, and a second main channel segment. The second main channel segment can adjoin a unifying segment of the channel structure, in which the measurement channel and the main channel are brought together. The second main channel segment can be situated at an angle of from 10° to 160°, preferably 135°, to the first main channel segment. A width of the second main channel segment can be smaller than a width of the measurement channel. The main channel can have at least one curved main channel segment that connects the first main channel segment and the second main channel segment. A maximum distance of the curved main channel segment to the inlet in the main direction of flow can be from 8.0 mm to 20.0 mm. A width of the second main channel segment can be smaller than a width of the first main channel segment. The main channel can taper in the curved segment. The curved segment can have at least two curvature radii. The sensor system can in addition have a cover for sealing the sensor housing. The channel structure can be fashioned in the cover.

In the context of the present invention, the main direction of flow is to be understood as the local flow direction of the fluid medium at the location of the sensor or sensor system; here for example local irregularities such as turbulences can be disregarded. In particular, the main direction of flow can thus be understood as the local averaged direction of transport of the flowing fluid medium. The main direction of flow can thus relate on the one hand to the direction of flow at the location of the sensor system itself, or also to the direction of flow in the channel inside the sensor housing, such as at the location of the sensor bearer or of the sensor chip, and these two named main directions of flow can differ. In the context of the present invention, the location to which the main direction of flow relates is therefore always indicated. If a more detailed indication is not given, the main direction of flow relates to the location of the sensor system.

In the context of the present invention, a downstream situation is to be understood as the situation of a component at a location that is reached by the fluid medium, flowing in the main direction of flow, temporally later than a reference point.

Analogously, in the context of the present invention an upstream situation of a component is to be understood as a situation of the component at a location that the fluid medium, flowing in the main direction of flow, reaches temporally earlier than a reference point.

In the context of the present invention, the sensor bearer can be fashioned entirely or partly as a circuit bearer, in particular as a circuit board, or as part of a circuit bearer, in particular of a circuit board. For example, the circuit bearer, in particular the circuit board, can have a prolongation that forms the sensor bearer and that extends into the channel, for example the measurement channel of a hot-film air mass sensor. The rest of the circuit bearer, in particular the circuit board, can for example be housed in an electronics compartment, in a housing of the sensor system or of a plug-in sensor of the sensor system.

In the context of the present invention, a circuit board is in general to be understood as a substantially plate-shaped element that can also be used as a bearer of electronic structures such as conductors, terminal contacts, or the like, and preferably also has one or more such structures. In principle, here at least slight deviations from the plate shape are also possible and are intended to be included in the reference of the term. The circuit board can for example be made of a plastic material and/or a ceramic material, for example an epoxy resin, in particular a fiber-reinforced epoxy resin. In particular, the circuit board can for example be fashioned as a circuit board having conductors, in particular printed conductors (printed circuit board, or PCB).

In this way, the electronics module of the sensor system can be greatly simplified, and for example a base plate and a separate sensor bearer can be omitted. The base plate and sensor bearer can be replaced by a single circuit board on which for example a control and evaluation circuit of the sensor system can also be completely or partly situated. The control and evaluation circuit of the sensor system is used to control the at least one sensor chip and/or to evaluate the signals generated by this sensor chip. In this way, by combining the named elements, the production outlay for the sensor system can be significantly reduced, and the constructive space requirement for the electronics module can be greatly reduced.

The sensor system can in particular have at least one housing, the channel being fashioned in the housing. For example, the channel can include a main channel and a bypass channel or measurement channel, and the sensor bearer and the sensor chip can be situated for example in the bypass or measurement channel. In addition, the housing can have an electronics compartment that is separate from the bypass channel, the electronics module or the circuit board being substantially housed in the electronics compartment. The sensor bearer can then be fashioned as a prolongation, extending into the channel, of the circuit board. This system is technically comparatively easy to realize, in contrast to the complicated electronics modules known from the existing art. Of course, alternatively the sensor bearer can also be realized as a plastic part, injected onto the base plate, of the electronics module.

In particular in the case in which a circuit board is used as a sensor bearer, but also in other cases, and/or given the use of other media as sensor bearer, the sensor bearer can be realized at least partly as a multilayer sensor bearer. Thus, the sensor bearer can be realized in a so-called multilayer technique and can have two or more bearer layers connected to one another. For example, these bearer layers can again be made of a metal, a plastic, or a ceramic material or a composite material, and can be connected to one another by bonding techniques such as gluing.

In this case, in which a multilayer technique is used with a plurality of sensor layers of the sensor bearer, the inflow edge can be made at least partly stepped, through a different dimensioning of the bearer layers opposite the main direction of flow of the fluid medium. In this way, the profiles can be realized so as to be at least approximately stepped. For example, in this way rectangular or (approximated by a step shape) at least approximately round, rounded-off, or wedge-shaped profiles can be formed in a sectional plane perpendicular to the plane of extension of the sensor bearer. The sensor chip can be situated on or in the sensor bearer in such a way that it is oriented perpendicular to the local main direction of flow. For example, the sensor chip can be made rectangular, one side of this rectangle being perpendicular or essentially perpendicular to the local main direction of flow, for example having an orientation that deviates from the perpendicular by not more than ten degrees.

The sensor chip can be electrically contacted via at least one electrical connection. For example, the sensor bearer, in particular a circuit board forming the sensor bearer or a prolongation of this circuit board, can have one or more conductors and/or contact pads that are connected to corresponding contacts on the sensor chip, for example by a bonding method. In this case, the electrical connection can be protected and separated from the fluid medium by at least one cover. This cover can in particular be realized as a so-called glob top, for example as plastic drops and/or adhesive drops that cover the electrical connection, for example the bonding wires. In this way, in particular influences on the flow by the electrical connection can also be reduced, because the glob top has a smooth surface.

In addition, the sensor chip can have at least one sensor region. This sensor region can for example be a sensor surface made for example of a porous, ceramic material and/or in particular a sensor membrane. The sensor membrane as measurement surface or sensor region can be made so that the flowing fluid medium can flow over it. The sensor chip includes for example at least one heating element, as well as at least two temperature sensors that are situated for example on the measurement surface of the sensor chip, one temperature sensor being mounted upstream from the heating element and the other temperature sensor being mounted downstream from the heating element. From an asymmetry of the temperature profile acquired by the temperature sensors, which profile is influenced by the flow of the fluid medium, a mass flow and/or volume flow of the fluid medium can be inferred.

A basic idea of the present invention is the omission of the conventional main channel outlet, and a unification of the main channel with the measurement channel in the interior of the channel structure, as well as a displacement of the common outlet in the upstream direction. Through the omission of the lateral outlet and the positioning of the common outlet at the end face of the plug-in sensor, there results a nearly symmetrical configuration of inlet and outlet, resulting in lower sensitivity when there are changes of the incoming flow, in particular changes in the angle of incidence at the plug-in sensor. In addition, the signal noise is reduced, because it is no longer the case that two pressures, in some circumstances fluctuating with opposite phases, act at a main channel and a bypass channel; rather, only one pressure level acts at the common outlet. The migration of the stagnation point shown in FIG. 6, and the degree of the temporal change of the ratio of the mass flow going through both channel parts, is reduced in this way. Even given quasi-steady flow boundary conditions, the design according to the present invention, having a common outlet, already results in a reduction of inflow sensitivity and a reduction of the signal noise. Due to the displacement upstream of the common outlet, a reduction of the distance between inlet and outlet results while maintaining the position of the inlet. Due to the reduced section, associated therewith, of acoustic waves running over the inlet and outlet, or standing over them, i.e., via the associated reduction of the effectively introduced pressure difference, there results a reduction of the mass flow fluctuation in the channel structure, which in turn has the consequence that a mass flow underindication, reduced in magnitude, is achieved. Due to the omission of the lateral main channel outlet and the formation of a common outlet, pressure differences between the main channel outlet and the measurement channel outlet are not present, resulting in improved capacity for calibration.

BRIEF DESCRIPTION OF THE DRAWINGS

Further optional details and features of the present invention are described below with reference to preferred exemplary embodiments, shown schematically in the Figures.

DETAILED DESCRIPTION OF EXAMPLE EMBODIMENTS

Figure 1:
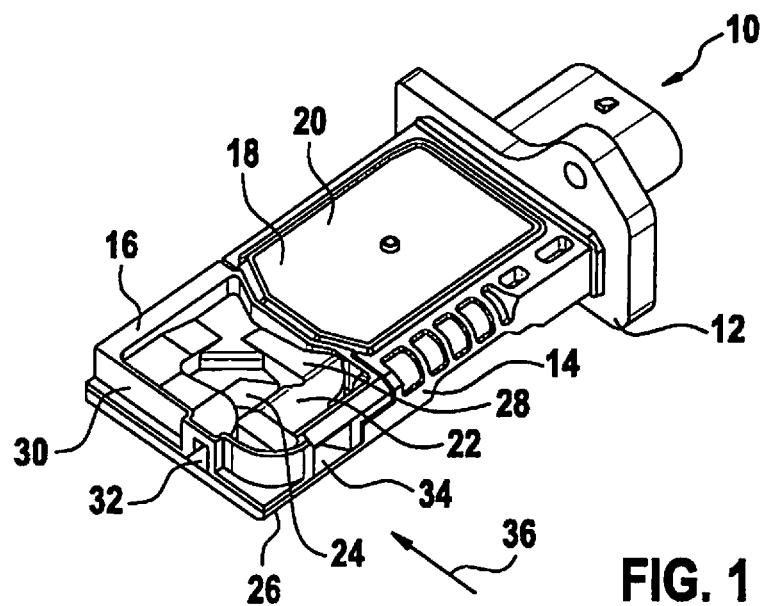
FIG. 1 shows a perspective view of a sensor system.

FIG. 1 shows a perspective view of a sensor system 10 for determining a parameter of a fluid medium. Sensor system 10 is fashioned as a hot-film air mass sensor, and includes a sensor housing 12 fashioned as a plug-in sensor, which can for example be inserted into a flow tube, in particular an intake system of an internal combustion engine. Sensor housing 12 has a housing body 14, a measurement channel cover 16, an electronics compartment 18, and an electronics compartment cover 20 for sealing electronics compartment 18. A channel structure 22 is fashioned in measurement channel cover 16. Channel structure 22 has a main channel 24 that discharges in a main channel outlet 25 (FIG. 6) on lower side 26 (relative to the depiction in FIG. 1) of sensor housing 12, and a bypass or measurement channel 28 branching off from main channel 24, which bypass channel discharges into a bypass or measurement channel outlet 32 situated in an end face 30 of sensor housing 12. A representative quantity of the fluid medium can flow through channel structure 22 via an inlet opening 32, which in the state of use is oriented opposite a main direction of flow 36 of the fluid medium at the location of sensor housing 12.

Figure 2:
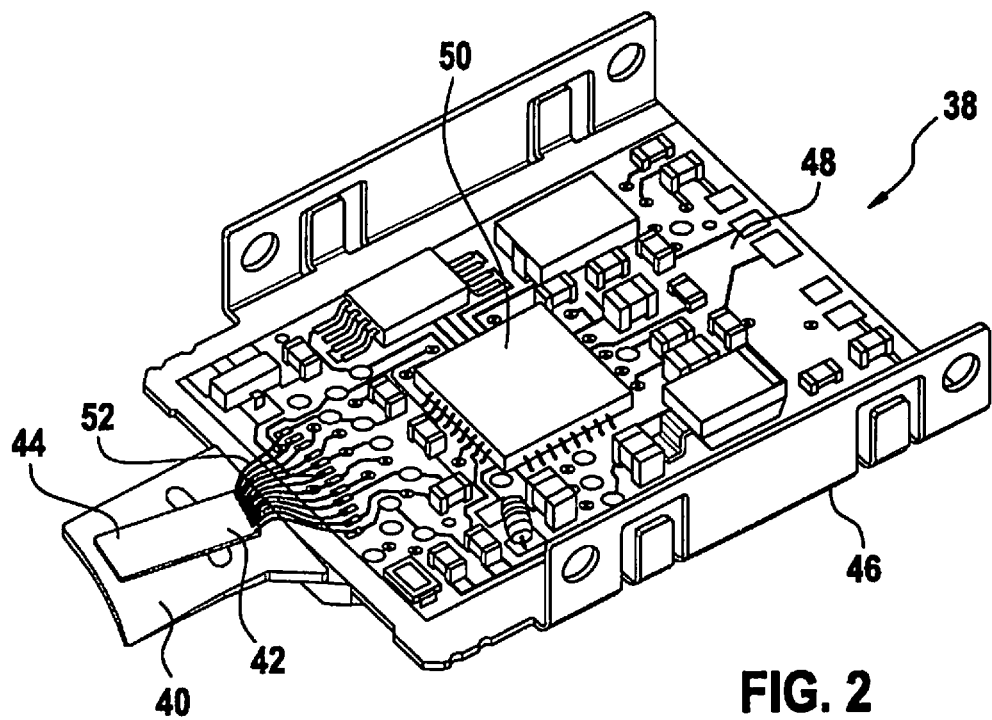
FIG. 2 shows an enlarged representation of an electronics module of the sensor system.

FIG. 2 shows an enlarged representation of an electronics module 38 of sensor system 10. In a state of use of electronics module 38, a sensor bearer 40, in the shape of a wing, extends into measurement channel 28. A sensor chip 42 is embedded in this sensor bearer 40 in such a way that the fluid medium can flow over a micromechanical sensor membrane 44 fashioned as sensor region of sensor chip 42. Sensor bearer 42 is, with sensor chip 42, a component of electronics module 38. Electronics module 38 further has a curved base plate 46 and a circuit board 48 attached, for example glued, thereon, having a control and evaluation circuit 50. Sensor chip 42 is electrically connected to control and evaluation circuit 50 via electrical connections 52, here realized as wire bonding. The resulting electronics module 38 is attached, for example glued, into electronics compartment 18 in housing body 14 of sensor housing 12. Here, sensor bearer 40 extends into channel structure 22. Subsequently, electronics compartment 18 is sealed by electronics compartment cover 20.

Figure 3:
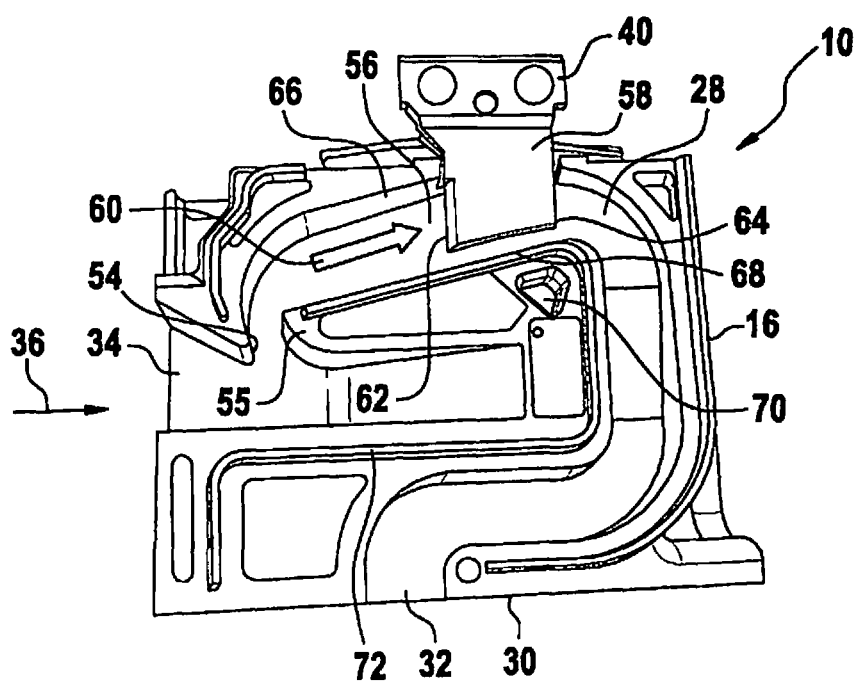
FIG. 3 shows a top view of the measurement channel cover, with the measurement channel and the sensor bearer.

FIG. 3 shows a top view of channel structure 22 in measurement channel cover 16. A centrifugal deflection 54 is situated in measurement channel cover 16. Situated opposite centrifugal deflection 54 is a counter-contour 55 having a tear-off edge. Measurement channel cover 16 is in addition fashioned such that a measurement channel ramp 56 is fashioned in measurement channel 28. In addition, the situation of sensor bearer 40 can be seen in FIG. 3. In a state of use, sensor bearer 40 extends into measurement channel 28. In the depiction in FIG. 3, rear or lower side 58 of sensor bearer 40 can be seen. Rear or lower side 58 is the side of sensor bearer 40 situated opposite sensor membrane 44. Sensor bearer 40 has in addition an inflow edge 62, oriented opposite a main direction of flow 60 of the fluid medium in measurement channel 28, which edge can be made rounded off, as well as a rear edge 64, situated downstream opposite inflow edge 62. Measurement channel ramp 56 extends in the region between centrifugal deflection 54 and rear edge 64 of sensor bearer 40. Measurement channel 28 is bounded, at least in the region of sensor chip 42, by housing body 14, measurement channel ramp 56 fashioned in measurement channel cover 16, a wall segment 66 fashioned in measurement channel cover 16 and facing the electronics compartment, and a wall segment 68 fashioned in measurement channel cover 16 and facing away from the electronics compartment. In addition, measurement channel cover 16 has a recess 70 as a positioning contour for a pin (not shown in more detail) of sensor housing 12, or of housing body 14, as well as a wall or spring 72 of a groove-spring system for gluing measurement channel cover 16 to sensor housing 12. In particular in the region of sensor bearer 40, a reliable, low-tolerance placement and gluing process has to be ensured. However, the geometrical tolerances in the placing and gluing of measurement channel cover 16 cause, inter alia, deviations in static and dynamic mass flow signals in the area of main channel outlet 25 as well, because there channel ramp 56 in measurement channel 28 is paired with the window contour of sensor housing 12.

Figure 4:
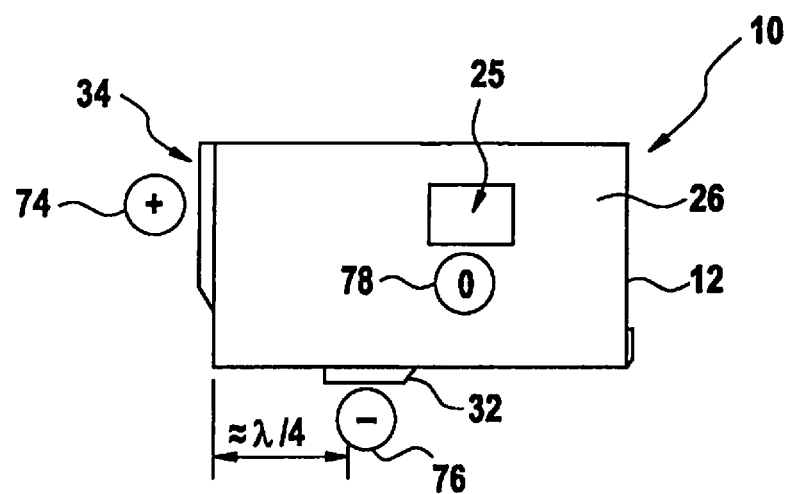
FIG. 4 shows a rear view of the sensor system.

FIG. 4 shows a rear view of sensor system 10. In FIG. 4, the pressure relations are shown at inlet opening 34, at main channel outlet 25, and at measurement channel outlet 32 of flow-guiding channel structure 22. At inlet opening 34, a higher pressure 74 prevails, compared to the static ambient pressure, while at measurement channel outlet 32 a lower pressure 76 prevails, and at main channel outlet 25 a pressure 78 prevails that is of the order of magnitude of the static ambient pressure. These pressure relations cause the flow through channel structure 22 in sensor housing 12. Because pressures 76, 78 at measurement channel outlet 32 and at main channel outlet 25 are of different strengths throughout, and can also be present in a ratio differing from that of the ideal flow, and because increases in pressure in opposite directions, partly out of phase, can occur at one outlet with simultaneous pressure reductions at the other outlet, the topology of two outlets in interaction with one inlet causes mass flow fluctuations at sensor chip 42. These mass flow fluctuations caused by topology are to be reduced by the realization of sensor system 10 according to the present invention.

Figure 5:
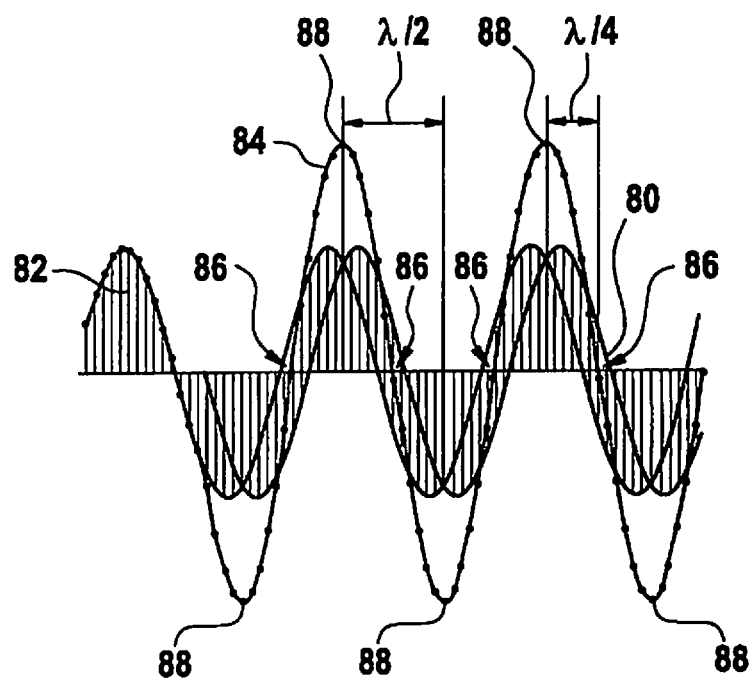
FIG. 5 shows possible curves of pressure waves.

FIG. 5 shows possible curves of pressure waves under such flow conditions. As a result of a reflected incoming pressure wave 80 and a reflected pressure wave 82, there results a superposed standing pressure wave 84, as well as oscillation nodes 86 and oscillation antinodes 88, with characteristic quarter wavelength λ/4. In oscillation nodes 86, the pressure level of the aerodynamic basic flow prevails, e.g., at sensor housing 12, in each case in connection with the pressure level described above in relation to FIG. 4 at inlet opening 34, at main channel outlet 25, and at measurement channel outlet 32. However, when an oscillation node 86 is removed, an additional pressure is impressed as shown in FIG. 5. This pressure oscillates from positive to negative pressures with a particular frequency, and from this a corresponding wavelength λ results for a particular medium, such as air, with its associated speed of sound propagation.

If, starting from an oscillation node 86, a quarter-wavelength step (=λ/4) is taken along the direction of propagation of the waves, one arrives at an oscillation antinode 88. A wave traveling past a fixed location thus causes pressure disturbances having a particular amplitude. In the case of a reflection and formation of a standing wave 84, the amplitudes add up to twice the amplitude of the incoming wave 80 (disregarding losses). At the distance of a half wavelength λ, it is even possible for fourfold amplitudes to arise from one antinode 88 to another, due to the opposite orientations of the pressure peaks.

High-frequency acoustic pressure oscillations can occur in the engine environment around sensor system 10, for example resulting from particular turbocharger operating states. These include the rotating flow tear-off at the blades and pumps of the turbocharger stage. The case in which a quarter of an acoustic wave is situated over inlet opening 34, main channel outlet 25, and measurement channel outlet 32 is shown as an example in FIG. 4 by the marked distance λ/4 for inlet opening 34 and main channel outlet 25. The same holds correspondingly for inlet opening 34 and measurement channel outlet 32. In this case, the additional acoustic pressure oscillations according to FIG. 4 are superposed on the aerodynamic pressure relations prevailing at right in FIG. 4. In turbocharger operating states, named above, frequencies on the order of magnitude of 3 kHz, and thus wavelengths of from 100 mm to 110 mm, can arise throughout. Corresponding λ/4 wavelengths agree well with the above-described distances between inlet opening 34 and main channel outlet 25 or measurement channel outlet 32. Even given smaller dimensions of sensor system 10, a corresponding segment of a pressure wave remains relevant to the air mass flow, via the resulting pressure differences in the segments.

Such a pressure oscillation has an effect on the air mass signal when an air mass flow pulsing with significant strength occurs in measurement channel 28 at the location of sensor bearer 40. In the layer adjoining sensor chip 42, there then occur fluctuations of the speed gradients that can strongly influence the heat transition. In the literature, this phenomenon is referred to as the "second Stokes problem." Due to the non-linear heat transition at the thermal measurement element, such a pulsation is not displayed in a manner true to the mean value. Instead, sensor system 10 shows an underindication.

FIG. 3 shows, in addition to the previous topology of the flow guidance, constructive boundary conditions that have to be taken into account in the embodiment according to the present invention. The majority of the mass flow entering into sensor housing 12 through inlet opening 34 flows from measurement channel outlet 32 via main channel outlet 25 and out of sensor housing 12. A small part of the mass flow flows over the region of centrifugal deflection 54 and counter-contour 55 having the tear-off edge in measurement channel 28, and to sensor bearer 40 with sensor chip 42 having micromechanical sensor membrane 44. Finally, the measurement channel mass flow flows out of sensor housing 12 via measurement channel outlet 32. The constructive boundary conditions are above all recess 70, as positioning contour for a pin in sensor housing 12, and the walls or springs 72 of the groove-spring system for gluing measurement channel cover 16 and sensor housing 12 together.

Figure 6:
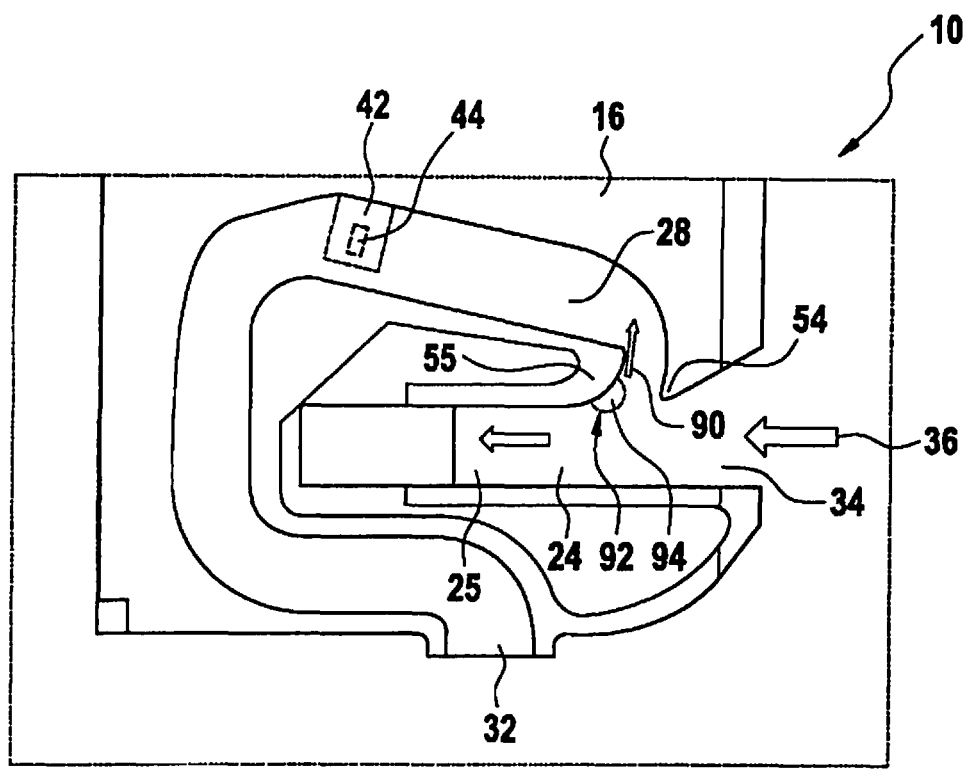
FIG. 6 shows a possible distribution of the flow speeds.

FIG. 6 shows a possible distribution of the flow properties in channel structure 22. The above-described flow topology causes a unsteady flow 90 at the branching 92 of measurement channel 28 and main channel 24, even given steady flow-mechanical boundary conditions. FIG. 6 shows the speed distribution in a sectional plane through channel structure 22, for an overall mass flow of 80 kg/h. Clearly visible is the division of the overall mass flow at inlet opening 34 into the mass flow at main channel outlet 25 and the mass flow in measurement channel 28. Characteristic for the branching is congestion point 94 at the wall of counter-contour 55 situated opposite centrifugal deflection 54. The ratio of the branching mass flows is not constant even given steady flow-mechanical boundary conditions, but rather wanders corresponding to the flow-mechanical boundary conditions: overall mass flow, pressure at the inlet opening, at main channel outlet 25, at measurement channel outlet 32, degree of turbulence, angle of incidence of sensor housing 12 in the flow tube, etc., because both the flow around sensor housing 12 and also the flow through channel structure 22 in the sensor housing practically always have an unsteady character. Even without a superposition of additional acoustic pressure oscillations, the branching topology with separate outlets for the main flow channel and the bypass channel thus causes mass flow fluctuations at micromechanical sensor membrane 44. Corresponding to the associated frequencies, these fluctuations can be relevant to the characteristic curves, or can cause a higher degree of signal noise.

Figure 7:
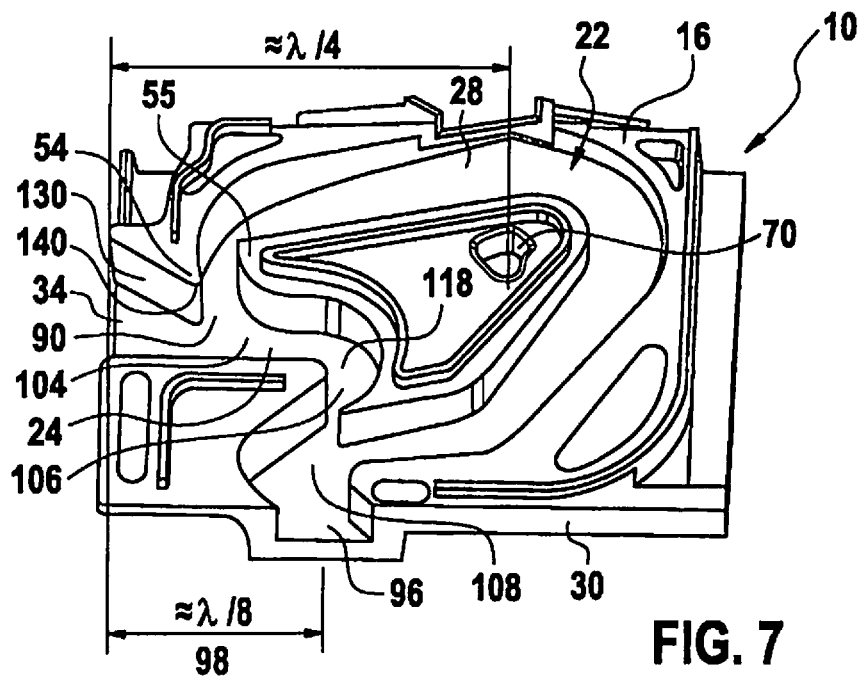
FIG. 7 shows a perspective view of a sensor system according to the present invention.

FIG. 7 shows a perspective view of a sensor system 10 according to the present invention. Here, in particular the differences from the above-described conventional sensor system are described. Channel structure 22 is fashioned such that measurement channel 28 branches off from main channel 24 at branching point 92. However, main channel 24 and measurement channel 28 discharge together into an outlet 96 situated in end face 30. Main channel outlet 25 is thus omitted.

Figure 8:
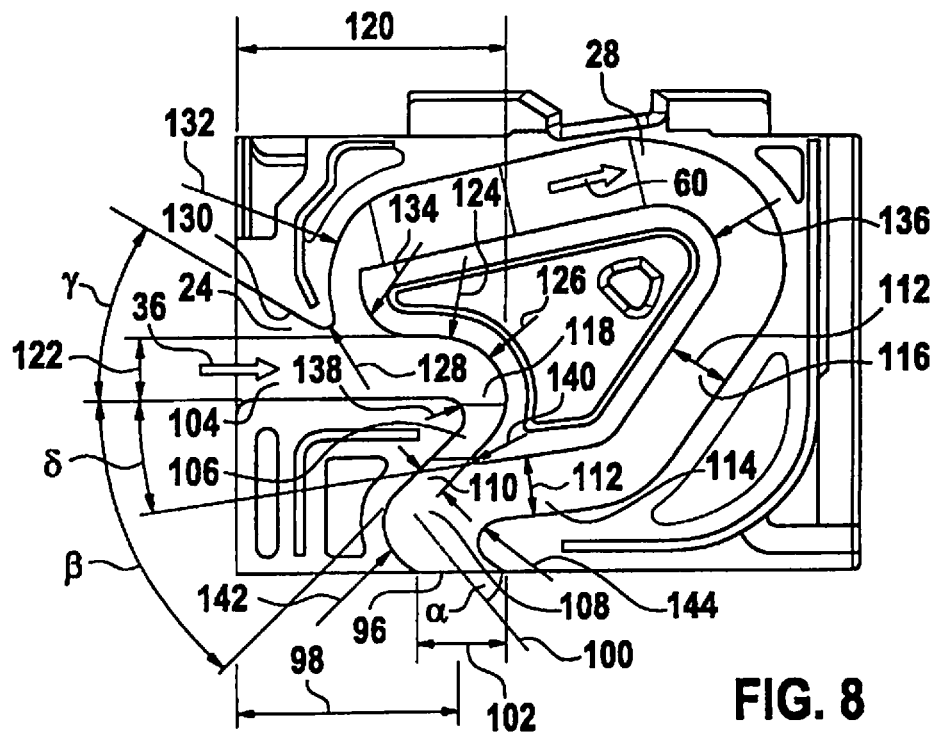
FIG. 8 shows a top view of the channel structure of the sensor system according to the present invention.

FIG. 8 shows a top view of channel structure 22 of sensor system 10 according to the present invention. A distance 98 of a midpoint of outlet 96 from inlet opening 34 in main direction of flow 36 is from 11.0 mm to 15.0 mm, and preferably from 12.0 mm to 14.0 mm, for example 13.0 mm. A midline 100 of outlet 96 is inclined at an angle $\alpha$ of from 30° to 50° downstream relative to main direction of flow 36, for example 40°. Outlet 96 has a width 102 of 3.0 mm to 8.0 mm, for example 5.0 mm. Due to the particular design of channel structure 22, main channel 24 has at least one main channel segment 104, in which measurement channel 28 branches off, and a second main channel segment 106. Second main channel segment 106 here is adjacent to a unifying segment 108 of channel structure 22 in which measurement channel 28 and main channel 24 are brought together. Second main channel segment 106 is situated at an angle $\beta$ of from 10° to 135° to first main channel segment 104, for example 45.5°. A width 110 of second main channel segment 106 is smaller than a width 112 of measurement channel 28. Thus, second main channel segment 106 has a width 110 of from 1.0 mm to 5.0 mm, for example 2.2 mm, whereas measurement channel 28 has a width 112 of 2.0 mm or 3.0 mm to 6.0 mm, for example 4.0 mm, depending on whether width 112 is determined at a location 114 or at a wider location 116.

In addition, main channel 24 has at least one curved main channel segment 118 that connects first main channel segment 104 and second main channel segment 106. A maximum distance 120 of curved main channel segment 118 to inlet opening 34 in main direction of flow 36 is from 10.0 mm to 20.0 mm, for example 15.22 mm. Moreover, width 110 of second main channel segment 106 is smaller than a width 122 of first main channel segment 104. Thus, width 122 of first main channel segment 104 is from 2.0 mm to 6.0 mm, for example 4.2 mm. Consequently, main channel 24 tapers in curved main channel segment 118. In particular, curved main channel segment 118 has at least two curvature radii 124, 126. A first curvature radius 124, situated upstream relative to main direction of flow 36 of second curvature radius 126, is from 3.0 mm to 10.0 mm, for example 5.0 mm, whereas second curvature radius 126 is from 1.5 mm to 10.0 mm, for example 3.8 mm.

Channel structure 22 can here have the further following geometrical dimensions. Centrifugal deflection 54 itself can be rounded, and can have a rounding radius 128 of from 0.1 mm to 0.5 mm, for example 0.3 mm. A channel wall 130, adjoining centrifugal deflection 54 and extending in the direction towards inlet opening 34, of main channel 54 can be inclined to the channel wall opposite centrifugal deflection 54 at an angle $\gamma$ of from 15° to 45°, for example 30°. The channel wall of measurement channel 28 adjoining centrifugal deflection 54 can be made curved with a radius 132 of from 3.0 mm to 8.0 mm, for example 6.0 mm. Counter-contour 55 can also be made curved, with a radius 134 of from 2.0 mm to 6.0 mm, for example 3.0 mm. Downstream relative to main direction of flow 60 in measurement channel 28, measurement channel 28 can be made curved with a radius 136 of from 4.0 mm to 10.0 mm, for example 7.0 mm. Curved main channel segment 118 can have a radius 138 on its wall side, facing away from measurement channel 28, of from 0.1 mm to 2.0 mm, for example 0.8 mm. A wall segment at which main channel 24 and measurement channel 28 are joined can be made curved with a radius 140 of from 0.1 mm to 2.0 mm, for example 0.1 mm. The wall segment at which main channel 24 and measurement channel 28 are joined can be situated at an angle $\delta$ to the channel wall situated opposite centrifugal deflection 54 of from 0° to 45°, for example 9.1°. Channel structure 22 can in addition extend with a curvature to outlet 96, with a radius 142 of from 1.0 mm to 5.0 mm, for example 2.8 mm, and with a radius 144 of from 0.25 mm to 3.0 mm, for example 1.0 mm.

In sum, in the sensor system according to the present invention, lateral main channel outlet 25 is omitted, main channel 24 is united with measurement channel 28, and the mass flow is guided out of sensor housing 12 through a common outlet 96. Via the adaptation of the branching region at centrifugal deflection 54, in the form of the radius and the offset of the opposite wall, the curve of main channel 24 in the form of convergence, the inner and outer radius at the point of unification of main channel 24 and measurement channel 28, and via the shape of the unifying region in the form of channel widths, the radius at the point of unification, the axial orientation of the two channels, the flow can be adjusted with regard to various requirements such as signal stroke, characteristic curve stability, signal noise, separation effect if contamination is present, behavior when there is conventional, low-frequency pulsation and in the case of acoustic high-frequency pressure oscillations.

The possibility of keeping the spring-groove system and the positioning contour compact results in a range of possible geometric shapes for optimizing the length and shape of the measurement channel downstream from sensor bearer 40, in particular in order to adjust the behavior in the case of low-frequency pulsations having high amplitudes. Also important is the possibility of intervention via various roundings in the region of the deflection of main channel 24 and in the region of unification of main channel 24 and measurement channel 28.

What is claimed is:

1. A sensor system for determining at least one parameter of a fluid medium flowing through a channel structure, the sensor system comprising:
   a sensor housing that is introduced or can be introduced into a flow tube, in which the channel structure is formed; and
   at least one sensor chip situated in the channel structure for determining the parameter of the fluid medium;
   wherein:
      the sensor housing has an inlet into the channel structure that is oriented opposite a main direction of flow of the fluid medium, and an outlet from the channel structure;
      the channel structure includes a main channel and a measurement channel;
      the measurement channel branches off from the main channel;
      the sensor chip is situated in the measurement channel;
      the main channel includes a first section from which the measurement channel branches;
      the main channel includes a second section that, with respect to the main direction of flow of the fluid medium, is downstream from the first section of the main channel and terminates at a downstream end of the main channel at a merging point at which the main channel and the measurement channel merge to thereby discharge together into the outlet from the channel structure; and
      the second section curves non-perpendicularly away from the first section of the main channel and/or curves non-perpendicularly to the merging point.

2. The sensor system as recited in claim 1, wherein the fluid medium is an air intake mass flow of an internal combustion engine, and the sensor housing is a plug-in sensor housing.

3. The sensor system as recited in claim 1, wherein the outlet is situated in an end face of the sensor housing.

4. The sensor system as recited in claim 1, wherein a distance of a midpoint of the outlet from the inlet, in the main direction of flow, is from 11.0 mm to 15.0 mm.

5. The sensor as recited in claim 4, wherein the distance is from 12.0 mm to 14.0 mm.

6. The sensor system as recited in claim 1, wherein a midline of the outlet is inclined at an angle of from 30° to 50° downstream relative to the main direction of flow.

7. The sensor system as recited in claim 1, wherein the outlet has a width of from 3.0 mm to 8.0 mm.

8. The sensor system as recited in claim 1, wherein a width of the second section of the main channel is smaller than a width of the measurement channel.

9. The sensor system as recited in claim 1, wherein the second section curves non-perpendicularly away from the first section of the main channel.

10. The sensor system as recited in claim 1, wherein the second section curves non-perpendicularly to the merging point.

11. The sensor system as recited in claim 1, wherein the second section curves non-perpendicularly both away from the first section of the main channel and to the merging point.

12. The sensor system as recited in claim 1, wherein a wall of the second section that is at an exterior of the curvature of the second section includes a first curvature radius and a second curvature radius downstream of, and different than, the first curvature radius.

13. The sensor system as recited in claim 12, wherein the first curvature radius is in a range of 3.0 mm to 10.0 mm and the second curvature radius is in a range of 1.5 mm to 10.0 mm.

14. The sensor system as recited in claim 1, wherein a central longitudinal axis of the second section of the main channel is at a non-perpendicular angle that falls within a range of 10° to 135° relative to a central longitudinal axis of the first section of the main channel.

15. The sensor system as recited in claim 1, wherein, over a course of the second section of the main channel as the second section curves away from the first section of the main channel, the second section of the main channel gradually tapers from a first width of the second section of the main channel to a second width of the second section that is narrower of the second section.

16. The sensor system as recited in claim 1, wherein a point of the second section of the main channel that is furthest, of all points of the second section, from the inlet into the channel structure is 10.0 mm to 20.0 mm.

17. The sensor system as recited in claim 1, wherein an angle of a central longitudinal axis of the second section of the main channel at the merging point to the main direction of flow of the fluid medium is a non-perpendicular angle that falls within a range of 10° to 135°.

18. The sensor system as recited in claim 1, wherein an angle of a central longitudinal axis of the second section of the main channel at the merging point is non-parallel relative to a central longitudinal axis of the outlet from the channel structure.

19. The sensor system as recited in claim 18, wherein the angle of the central longitudinal axis of the second section of the main channel at the merging point is non-perpendicular relative to the central longitudinal axis of the outlet from the channel structure.

20. The sensor system as recited in claim 1, wherein a central longitudinal axis of the second section of the main channel at the merging point is non-perpendicular to a central longitudinal axis of the measurement channel at the merging point.

\* \* \* \* \*